United States Patent [19]
Shea

[11] Patent Number: 5,619,560
[45] Date of Patent: Apr. 8, 1997

[54] RESIDENTIAL FUEL OIL TANK LEVEL REPORTING DEVICE

[75] Inventor: Arthur W. Shea, Somerville, Mass.

[73] Assignee: Scully Signal Company, Wilmington, Mass.

[21] Appl. No.: 465,341

[22] Filed: Jun. 5, 1995

[51] Int. Cl.⁶ .................................................. H04M 11/00
[52] U.S. Cl. .................. 379/106; 340/870.19; 340/623; 340/870.17; 340/618
[58] Field of Search .................................. 379/106, 107, 379/354–356; 340/618, 623, 625, 870.19, 870.17, 672

[56] References Cited

U.S. PATENT DOCUMENTS

| | | |
|---|---|---|
| Re. 31,089 | 11/1982 | Adamson . |
| 3,588,357 | 6/1971 | Sellari, Jr. . |
| 3,842,208 | 10/1974 | Paraskevakos . |
| 3,899,639 | 8/1975 | Cleveley et al. . |
| 4,059,727 | 11/1977 | Kingswell et al. . |
| 4,147,893 | 4/1979 | Matson . |
| 4,486,625 | 12/1984 | Reinauer et al. . |
| 4,646,085 | 2/1987 | Mathis ............... 340/870.19 |
| 4,675,668 | 6/1987 | Ise et al. . |
| 4,691,344 | 9/1987 | Brown et al. ............. 379/106 |
| 4,845,486 | 7/1989 | Knight et al. . |
| 4,852,152 | 7/1989 | Honick .................... 379/106 |
| 4,883,618 | 5/1989 | Verma et al. ............. 379/107 |
| 4,996,703 | 2/1991 | Gray ........................ 379/106 |
| 5,161,182 | 11/1992 | Merriam et al. ......... 379/106 |
| 5,235,634 | 8/1993 | Oliver ....................... 379/106 |
| 5,283,569 | 2/1994 | Nelson ..................... 379/106 |
| 5,406,269 | 4/1995 | Baran ....................... 379/40 |
| 5,454,031 | 9/1995 | Gray et al. ............... 379/106 |

OTHER PUBLICATIONS

STS Product Advertisement I, Approx. Sep. 1989.
STS Product Advertisement II, Approx. Sep. 1989.
STS Product Advertisement III, Approx. Sep. 1989.
STS Product Advertisement IV, Approx. Sep. 1989.
STS Product Advertisement V, Approx. Sep. 1992.

*Primary Examiner*—Wing F. Chan
*Attorney, Agent, or Firm*—Bookstein & Kudirka, P.C.

[57] ABSTRACT

A remote level sensor for a residential fuel oil tank is adapted for a fuel oil gauge with a permanent magnet which changes position with changing fluid levels in the tank. The sensor has a housing with a connector which receives a top portion of the gauge such as to provide an alignment of the sensor with the gauge. The sensor is connected to a telephone line, and makes use of a current from the "tip" and "ring" lines of the telephone connection to supplement the power of an on-board battery. The sensor has multiple reed switches each in a different relative position. The reed switches thus each close when the magnet is in a different position, and thereby close when the fluid in the tank is at a different level. The controller has a sampling routine which responds to the detection of a closure of one of the switches by seizing the telephone line, dialing a central monitoring location and transmitting information to the central location indicating which of the switches was closed. A memory unit is provided in which multiple telephone numbers are stored so that the controller can call a second number when no response is received using a first number.

15 Claims, 4 Drawing Sheets

RESIDENTIAL FUEL OIL TANK LEVEL REPORTING DEVICE

BACKGROUND OF THE INVENTION

1. Field of the Invention

This invention relates to residential fuel oil reporting systems in which a each of a plurality of remote fuel oil level sensors monitors the fuel oil level in a particular oil tank and sends information to a central location in response to a low fuel oil condition.

2. Description of the Related Art

Fuel oil which is used to heat residences and buildings is generally stored in small tanks located either inside the building, outside the building or in the ground near the building. In order to ensure that an adequate supply of fuel is available to the building furnace, each residential tank must be periodically refilled by making a fuel oil delivery to the tank location. Such fuel oil deliveries are presently made by a central distributor utilizing small tank trucks.

A problem exists in this supply system in that the oil tanks must be filled before the supply of fuel runs out, but predicting the rate of consumption is difficult. It is not economical for the fuel oil distributor to refill the tanks on a set schedule, especially during the warmer seasons in which fuel oil consumption is at a minimum. Accordingly, fuel oil distributors may schedule a delivery to a particular tank based on a usage history for that tank and recent weather conditions. This type of delivery is referred to as a "degree-day" system, and uses mathematical algorithms to predict the rate of fuel oil consumption for each tank.

Because of variations in usage patterns from one location to another, predictive algorithms for determining when to make a delivery tend to be imprecise. For this reason, a number of prior art systems have been used which automatically monitor the level of oil in a tank, and communicate information regarding the oil level to a central receiving station, generally by means of a direct dial telephone network. In the central receiving station, the information is processed and a report is generated so that a delivery of fuel oil can be scheduled to replenish the customer's supply before it runs out.

Two types of remote signaling have been used in the past. In a first type, the central monitoring location initiates a telephone call to each remote location in order to gather tank level information. The telephone calls placed by these systems, however, can prove annoying to residents of the building where the tank is located, particularly if the calls come at an inconvenient time. An example of such systems is shown in U.S. Pat. Nos. 3,899,639 and 4,147,893.

In the second type, a sensor/signaling unit at each remote location monitors the fluid level in the oil tank and initiates a telephone call to the central location when a low fuel condition is detected in the tank which it monitors. These systems may include a means for testing the status of the phone line (which is typically also used by the residents for normal telephone service) so that the line is seized by the device only when there is no existing call detected on the line. Examples of such systems are shown in U.S. Pat. Nos. 3,588,357, 3,842,208, 4,059,727 and 4,486,625.

Because it is not uncommon for the monitoring system of a single distributor to include several hundred remote units, it is desirable to make each of the remote units as inexpensive and simple to install as possible. Some methods of reducing the overall cost of the remote sensing units include use of an inexpensive fuel level sensor, an inexpensive mechanism to transmit information to the central location over the telephone network and a construction which allows the unit to be easily and quickly installed.

These problems were addressed to some degree by U.S. Patent No. 4,845,486. This patent teaches a manner of encoding information for transmission by the remote unit which does not require an expensive, highly stable oscillator. It also teaches the use of a battery so that no external power supply connections are required. Furthermore, this patent describes the use of a reed switch within a sensor used by the remote unit. The sensor clips to a gauge common in many residential fuel oil tanks, and the reed switch is activated a magnet positioned on a level indicator which moves within the gauge when the oil level changes.

SUMMARY OF THE INVENTION

While the prior art features of a battery power source and a clip-on sensor helps reduce the expense of the remote unit and simplify installation, relatively short battery life requires somewhat frequent battery replacement. The sensor unit requires alignment by hand by the person installing the remote unit, who slides the clip-on sensor into the appropriate positioning on the gauge, so that the reed switch is triggered at the appropriate oil level. Furthermore, only the sensor unit is located on the gauge, such that electrical connections are required between the sensor and a microcontroller, which is located elsewhere. The microcontroller, which is in turn connected to a telephone line, detects an output from the reed switch and responds by initiating a call to the central monitoring location. Finally, prior art devices respond only to a single fluid level for initiating a call to the central location. This provides the oil distributor with a very limited amount of information regarding the oil level status of the residential oil tanks being serviced, specifically, which tanks have been reported as being in a low fuel state and which have not.

The present invention provides a residential fuel oil tank level reporting device which uses a battery power source, but which greatly extends the life of the battery as compared to prior art devices. This is accomplished by accessing a secondary power supply which does not require any additional external connections. Specifically, when in a "sleep" mode, the invention makes use of an electrical current supplied on the telephone line itself. In the preferred embodiment, which is constructed to have a very low power consumption, this telephone line current amounts to at&proximately two-thirds of the power consumed by the invention during "sleep" mode, thus greatly reducing the continuous drain on the battery.

The present invention is of single-body construction. That is, all of the components of the remote sensing unit are located in a single housing, which attaches to a typical fuel tank gauge. Thus, no external connections coupling a sensing unit and a processing/call initiating unit are required. The use of a minimal number of lightweight components allows the entire remote unit to be slipped over the gauge and connected to a telephone line, significantly simplifying installation. This eliminates the need for mounting a controller housing away from the gauge, and prevents possible failure of the unit due to the damaging of external connections between a sensing unit and a controller housing.

The housing of the present invention is also self-aligning relative to the position of the gauge. The housing has a first connector by which it is attached to and positioned relative to the gauge. This connector is rigidly connected to the housing, and comprises a concave portion which receives a top portion of the gauge, such that bringing the first connector into contact with the gauge serves to locate the housing in a predetermined position relative to the housing. In the preferred embodiment, the housing is also connected to the gauge by a second connector, which encompasses at least a portion of a perimeter of the gauge. The second connector is preferably compliant and slightly smaller in diameter than the gauge such that a pressure fit is formed between the second connector and the gauge. Thus, the connectors of the housing may be slipped over the gauge such that the housing is retained in a predetermined position adjacent to the gauge. Sensors within the housing are fixed in position relative to the housing, and are therefore fixed in a predetermined position relative to the gauge when the housing is mounted on the gauge.

The present invention also provides more information to the distributor by initiating calls to the central monitoring location for a plurality of different fuel level conditions. In the preferred embodiment, the central location is notified by the remote sensor for a particular tank when the fuel level in that tank has dropped below each of one-half, one-quarter and one-eighth of full tank capacity. These different levels are detected by a plurality of reed switches, each of which has a different position relative to the gauge. As the fluid level in the tank drops, a permanent magnet on an indicator in the gauge moves relative to the housing of the remote device. Each reed switch is activated in turn as the proximity of the magnet to it becomes sufficiently close. The activation of each of the reed switches is detected by a controller for the remote device, which initiates a call to the central location as each of the level switches is activated.

In the preferred embodiment, controller maintains a state machine which changes states as each reed switch is activated by the magnet. Thus, if the range of positions for which the magnet will activate a switch may overlap from switch to switch, the state machine continues to provide an indication of the last switch to be activated (and therefore of the correct level of the oil in the tank). In the preferred embodiment, a call is also initiated to the central location when the inputs from the switches indicate that the tank was refilled. This may represent an additional state of the state machine, and thereby serve to essentially "reset" the state machine. In the preferred embodiment, the controller also monitors the battery voltage and initiates a call to the central monitoring location when the battery voltage drops below a predetermined level.

DETAILED DESCRIPTION OF THE PREFERRED EMBODIMENT

Figure 1:
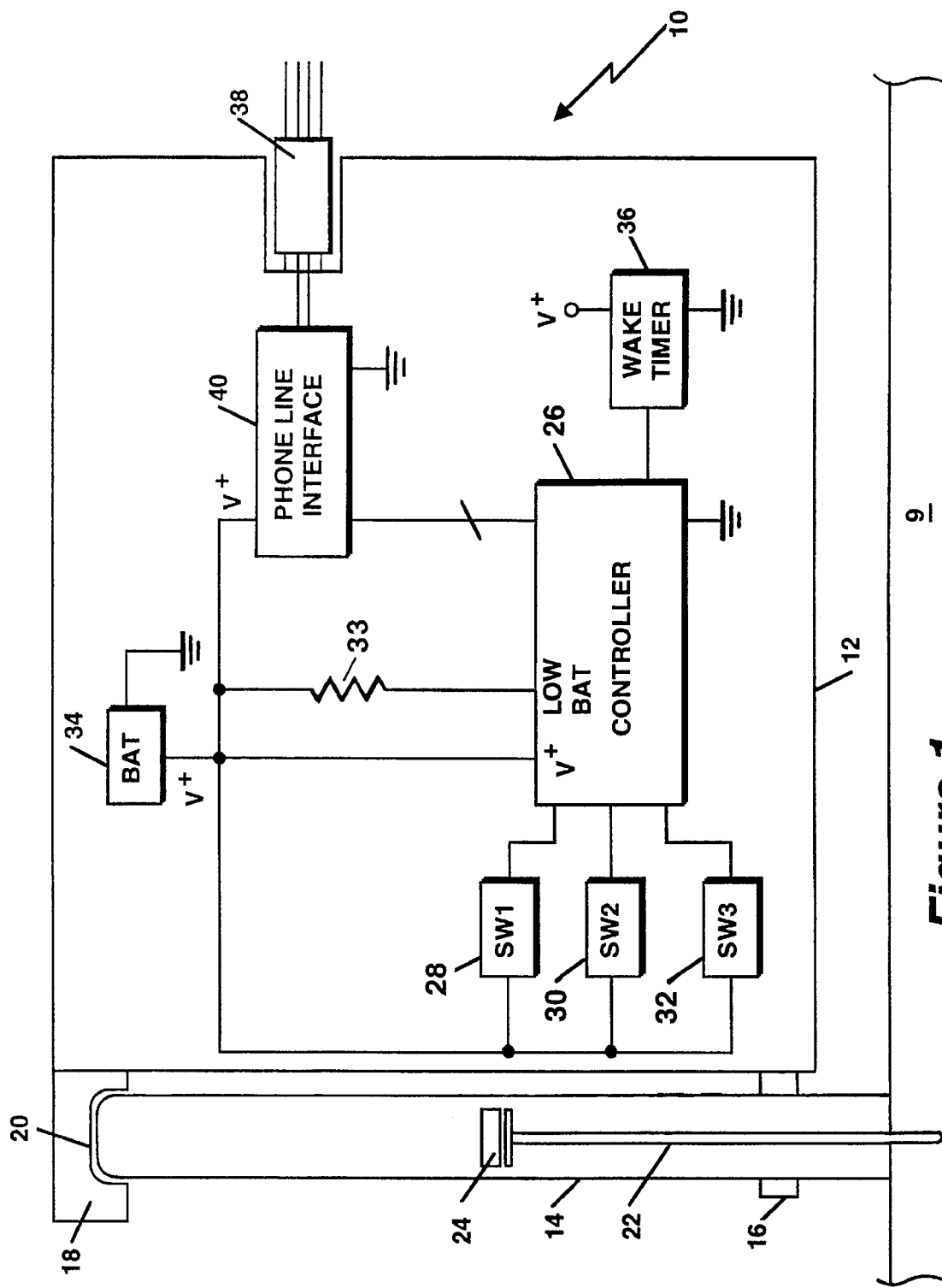
FIG. 1 is a schematic view of a residential fuel oil remote sensing device according to the present invention.

Shown in FIG. 1 is a schematic depiction of a remote sensing device 10 according to the present invention. The device 10 has a housing 12 which is connected to a gauge 14 of a residential fuel oil tank 9 (partially shown). The gauge 14 is substantially cylindrical in shape, and is of a size and shape which is typical of such gauges. The housing 12 is attached to the gauge 14 by an upper connector 16 and a lower connector 18.

The connectors 16, 18 (shown in cross section in FIG. 1) are such that they retain the housing adjacent to the gauge 14 when slipped over the top of the gauge. The lower connector 16 is annularly-shaped and, when slipped over the gauge 14, encompasses a portion of an outer surface of the gauge 14, providing lateral support to the housing. The lower connector 16 is a somewhat compliant material, such as polypropylene, and has an inner diameter which is slightly smaller than an outer diameter of the gauge 14. Thus, the lower connector provides a pressure fit which maintains the orientation of the gauge. The upper connector 18 has a concave portion 20 which receives a top surface of the gauge 14. The concave portion 20 rests on the top of the gauge, and provides both vertical and lateral support to the housing 12. It also serves to align the internal components of the housing 12 with the gauge. Thus, a person installing the remote unit 12 need only slip the connectors 16, 18 over the gauge 14, and the housing 12 is retained in a predetermined position adjacent to the gauge.

A changing level of fuel oil in the tank causes the change in position of a level indicator 22 within the gauge 14. The level indicator 22 is part of a level sensing mechanism which is commonplace in existing residential fuel oil tanks. As the level of oil in the tank drops, the vertical position of the level indicator 22 drops proportionately. A permanent magnet 24 is located on top of the level indicator 22, and moves with it. The relative location of the magnet is detected by the remote sensing unit 10, and is used as an indication of the level of fuel oil in the tank.

The remote sensing unit 10 is sized to attach to a Scul-tel type gauge, manufactured by Scully Signal Company. Many existing gauges already contain magnet 14 (e.g. if they previously operated with prior art remote sensors having reed switches). If not, a magnet may be dropped onto the top of the level indicator 22.

The electrical components of the remote sensing device 10 are shown in FIG. 1 in block diagram form. Those skilled in the art will recognize that the hybrid format of FIG. 1 is for descriptive purposes.

Contained within the housing 12 of the remote sensing unit 10 is a controller 26, which controls operation of the device. The controller may be of known design, but preferably makes use of low-cost, low-power components, such as the Zilog Z86L72 Infrared Remote Controller. The Zilog controller also has embedded timers and demodulators which are used in the preferred embodiment of the invention.

Three reed switches 28, 30, 32 are located in the housing near the wall of the housing which resides adjacent to the gauge 14 when the remote sensing unit 10 is properly mounted on the gauge 14. In the preferred embodiment, the switches are normally open, and close upon the influence of a sufficiently strong magnetic field (although those skilled in the art will recognize that normally closed reed switches could also be used). As the oil level in the tank gradually decreases, the location of the magnet 24 becomes gradually lower. When the proximity of the magnet to a particular reed switch is sufficiently close, that switch closes, connecting a voltage from battery 34 to its respective input to controller 26.

The controller 26 operates in a "stop" (or "sleep") mode, which is a low-power consumption mode commonly known in the art of microcontrollers. In the preferred embodiment, the controller is "awakened" by a "wake" timer 36 approximately every fifteen minutes. The wake timer may be of known design, but is preferably constructed from discrete low power components so as to conserve battery power. When the timer expires, it outputs a pulse to the controller 26 which initializes a sampling routine stored in a local memory of the controller. The controller, in executing the sampling program, samples the inputs from the reed switches. Depending on the state of the switch inputs, the controller may then branch to a calling routine to report a change in fluid level. The circumstances under which the calling routine is initiated are described in further detail hereinafter.

The use of the controller "stop" mode and timer initiated wake-up also helps to conserve battery power. While the preferred embodiment uses a wake timer which initiates a sampling routine every fifteen minutes, those skilled in the art will recognize that this "sleep" time may be somewhat longer or shorter without significantly affecting the performance of the remote sensing device 10.

The modem functions of the remote sensing device 10 are accomplished by the controller 26. The only external connection to the remote device 10 is telephone jack 38, the red and green ("tip" and "ring") wires of which are interfaced with the controller via phone line interface circuitry 40. The interface 40 (described in further detail hereinafter) provides the necessary signal buffering and conversion to allow the controller 26 to communicate over the telephone line. Fuel level calls initiated by the controller 26 are made in response to a change in the reed switch inputs and, in the preferred embodiment, follow a state machine maintained by the controller 26.

Figure 2:
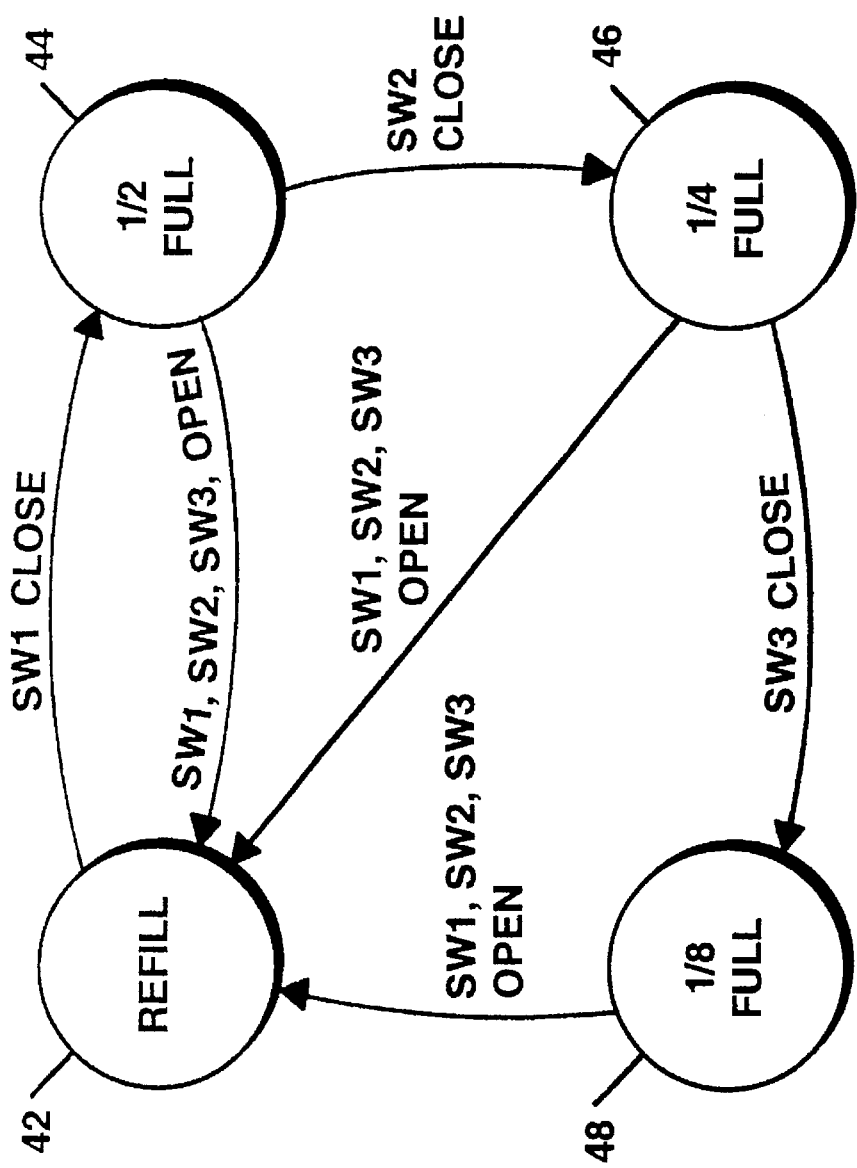
FIG. 2 is a state diagram showing the low fuel level call up states of a firmware routine followed by a residential fuel oil remote sensing device according to the present invention.

State machines are well-known in the art of software design, and the state machine used by controller 26 for initiating fuel level calls to the central monitoring station is depicted schematically in FIG. 2. The state machine has four states which correspond to four different detected fluid levels in the tank. In the preferred embodiment, the reed switches are located in housing 12 such that they are triggered by the magnet 24 when the oil level reaches certain predetermined relative levels. The first switch (SW1) 28 is closed when the quantity of oil in the tank drops to approximately one half the tank capacity; the second switch (SW2) 30 is closed when the oil drops to approximately one quarter of a tank; and the third switch (SW3) 32 is closed when the oil drops to approximately one eighth of a tank. The states of FIG. 2 describe how the controller 26 responds to these switch closures.

State 42 (the "refill") state is the state in which the state machine resides after a refill of the tank, and all of the switches 28, 30, 32, are correspondingly open. As oil is consumed, the state machine remains in this state until the oil level drops to ½ tank. Upon reaching ½ tank, the magnet 24 is close enough to SW1 28 to pull it closed and, during the next sampling routine of the controller 26, that switch closure will be detected. The controller responds by initiating a call to the central monitoring location, and reporting the drop to the ½ tank level. It also advances the state machine to state 44 (the "½-full" state).

As the oil level drops far enough that magnet 24 causes the closure of SW2 30, the positive voltage on the SW2 input to the controller is detected during the next sampling routine. The controller 26 responds by initiating a call to the central monitoring location to report the drop to the ¼ tank level. It also advances the state machine to state 48 (the "¼ full" level).

When the oil level drops enough that the magnet 24 causes the closure of SW3 32, the positive voltage on the SW3 input to the microcontroller will be detected during the next sampling routine. Upon detecting this signal, the microcontroller initiates a call to the central monitoring location reporting the drop to ⅛. It also advances the state machine to state 48 (the "⅛-full" state).

When a tank has dropped below the ⅛ tank level, and the remote unit 10 has reported the condition to the central monitoring location, a refill of the tank will typically be ordered immediately by the distributor, who has a truck refill the tank. When the state machine is in state 48 and, during a sampling routine, the controller 26 detects all three of the switches open, it initiates a call to the central monitoring location to report that the tank has been refilled. The controller 26 then advances the state machine to state 42.

In prior art systems, a single refill level (typically the ½ tank level) is used as the only level detection point and point at which the remote sensing unit initiates a call to the central monitoring location. That single level reporting method prevents tanks from being completely emptied, but does not supply any information to the distributor prior to the reaching of a low-fuel condition. Thus, predicting upcoming customer need was a rather inexact science. With the multiple reporting levels of the present invention, the distributor has a more precise knowledge of the oil levels of the tanks of different customers, and can better anticipate overall customer need.

The more exact knowledge of the oil level of a particular tank is also beneficial in that it allows the distributor to refill a tank which has not yet reached the "refill" level if it is convenient to do so. On occasion, an oil delivery truck may contain a quantity of oil after making all its scheduled deliveries. If the truck is in vicinity of a customer whose tank has not yet reached the ⅛ level, but has reached, for example, the level or the ½ level, it may be desirable to refill that tank at that time, rather than to wait until the ⅛ tank level is reached.

As shown in FIG. 2, the controller 26, when in either of states 44 or 46, is responsive not only to the next likely switch closure, but also to the opening of all three switches. This provides a "reset" of the state machine to state 42 when the tank is refilled while the state machine is in state 44 or state 46. Thus, refilling of the tank prior to reaching "⅛-full" state 48 still results in a proper return of the state machine to state 42. However, in the preferred embodiment, only the condition of all three switches being open will result in the initiation of a call to the central monitoring location to report a refill. If the tank is filled from ⅛ to ¼ tank, all three switches will not be open and no call will be initiated. This also prevents a call-up from being initiated if the controller 26 is sampling the switches while the tank is being filled (until the fuel level rises above the ½-tank level). Finally, since as the magnet 24 moves well below the ⅞ tank level, previously-closed SW1 28 may re-open, being out of range of the magnetic field of magnet 24. However, only the condition of all three switches being open is sufficient to initiate a refill call, and the controller will not respond to this opening of just SW1 28.

Figure 3:
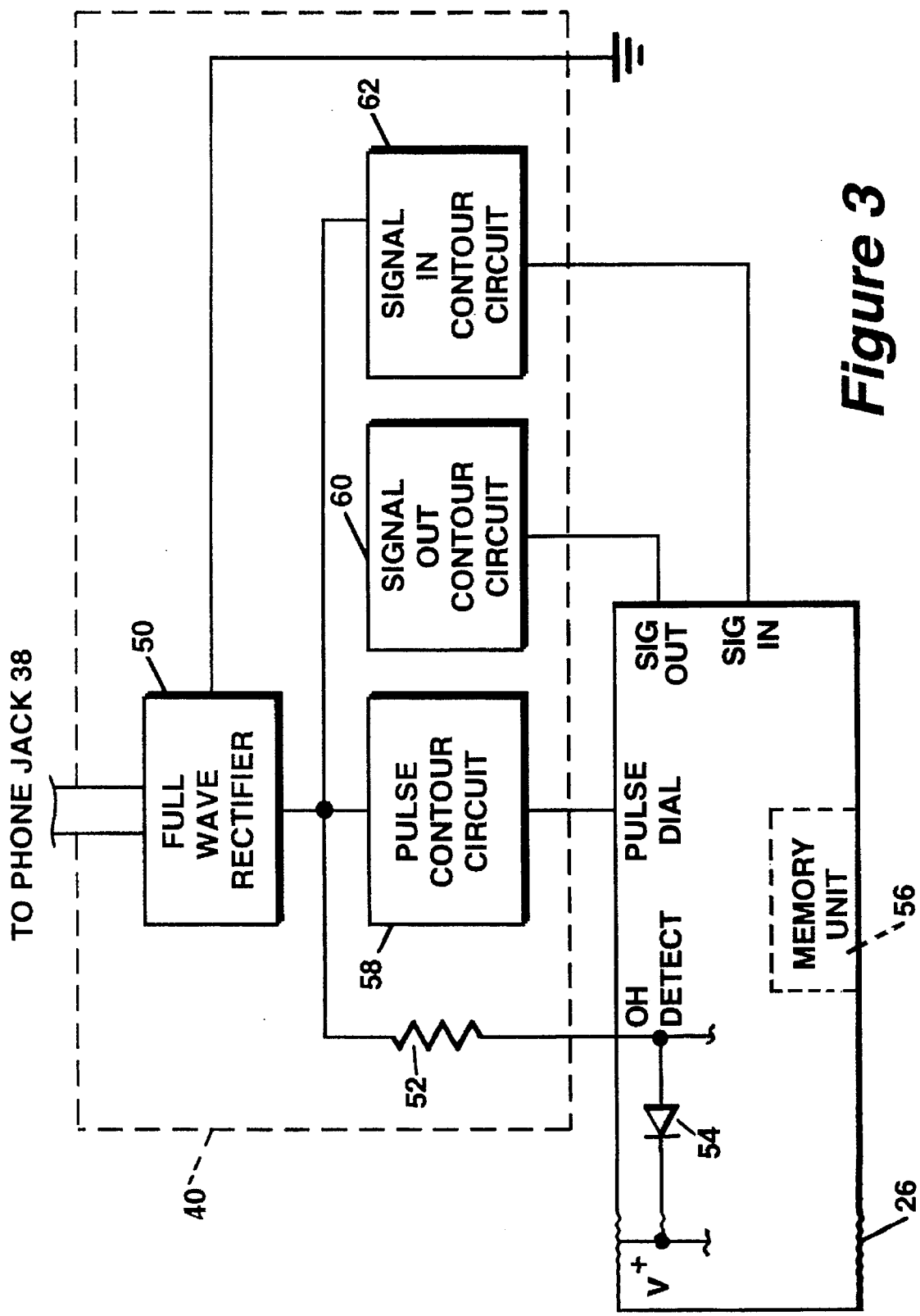
FIG. 3 is a schematic illustration of the telephone interface of a controller for a residential fuel oil remote sensing device according to the present invention.

Additional detail of the controller 26 and phone line interface 40 is shown in FIG. 3. The red and green (or "tip" and "ring") signal lines from telephone jack 38 connect first to full wave rectifier 50, that passes a rectified signal to the other components of interface circuit 40. All electrical signals between controller 26 and phone jack 38 therefore travel through the same electrical node. The telephone functions performed by controller 26 include off-hook detection, pulse dialing, signal transmission and signal reception. Each of these functions is discussed below with reference to FIG. 3.

In order to avoid interruption of a telephone call on the telephone line, the controller 26 monitors the output of rectifier 50 for a voltage drop indicative of the line being "off hook". The output of rectifier 50 is connected to an "off-hook (OH) detect" input of the controller 26 via a current-limiting resistor 52. When the controller detects that the phone line is "off-hook", it inhibits the output of any signals to the phone line until the "off-hook" condition has ended. Also shown in FIG. 3 is a diode 54 by which the OH controller input is connected to the "V+" power input of the controller 26, and therefore to the power node of the remote sensing device 10.

When the controller 26 is in "sleep" mode, a current of approximately four microamps flows from the phone line to the V+ input through diode 54. While, in the preferred embodiment, the diode is formed from a semiconductor junction within controller 26, those skilled the art will recognize that it can also be a discrete component external to the controller. In the preferred embodiment, the current draw of the entire remote sensing device is approximately six microamps when the controller is in "sleep" mode, and the current injected from the phone line therefore constitutes approximately two-thirds of the power drawn by the remote device 10 during this time. Since, in the preferred embodiment, the controller 26 is "awakened" only once every fifteen minutes or so, power consumption of the device 10 is greatly reduced by using the supplemental power from the telephone line, and battery life is correspondingly extended.

When the controller 26 samples its reed switch inputs during a periodic execution of its sampling routine, and detects a change in the inputs which requires the initiation of a call to the central monitoring location to report the change, it proceeds to seize the phone line. However, it will only seize the line if an "off-hook" condition is not detected at the "OH detect" input port of the controller 26 and if a "ringing" signal is not detected at the "SIG IN" port of the controller 26 (having been passed by "signal in contour circuit 62"). To take the phone line off-hook, controller 26 outputs a low voltage on its "pulse dial" output. In the preferred embodiment, no dial tone detection circuitry is used, due to its cost and power consumption. Instead, since telephone service providers guarantee a dial tone within two seconds of taking a line off-hook, the controller simply delays for two seconds before outputting dialing pulses.

A memory unit 56 is shown in FIG. 3 as being located within controller 26. In actuality, the memory unit 56 may be a separate, discrete component which is accessed by the controller 26. However, for ease of description, it is shown as integral with the controller 26.

The memory unit 56, which is preferably an electrically-erasable, programmable read-only memory (EEPROM), is used for storing telephone numbers to be dialed by the controller (discussed further below) and encoded data for transmission to the central monitoring location indicative of the condition for which a call-up is initiated. When the controller has seized the phone line, it then accesses memory unit 56 for the telephone number to be dialed. Reading a first number from memory, the controller then generates pulses at the pulse dial output which correspond to a telephone number of the central monitoring location. Pulse contour circuit 58 is of conventional type, and contours the pulses output from the controller 26 so that they have the correct amplitude and shape for transmission over the phone line. The controller 26 then waits for a signal at input "signal in" which indicates that the call has been answered at the central monitoring station.

When a modem at the central monitoring location answers the call from the remote unit 10, it outputs an "answer" signal on the telephone line which is transmitted with the telephone switching network to the remote device 10. The signal is passed to controller 26 via "signal in contour circuit" 62, which is of conventional design and provides some current limiting and any signal contouring necessary to place the signal in an appropriate format for controller 26. When the controller 26 detects the "answer" signal, it generates a signal code which is indicative of the reason for the call-up (e.g. ½ tank level reached), and outputs it on its "signal out" output port. This information may be stored in memory unit 56. The encoded output signal passes through "signal out contour circuit" which is of conventional design and which provides any contouring of the signal (e.g. smoothing of square wave pulses) necessary before outputting on the telephone line.

After transmission of the encoded data, the controller 26 waits for an acknowledgment signal from the central monitoring location which confirms that the data has been received. The central monitoring location may also transmit a prompting signal which prompts controller to accept new data, such as new telephone numbers for storage in memory unit 56. If there is such a prompting signal, the controller 26 accepts the new data via the "signal in" input, and is reprogrammed in a known manner. After some further handshaking between controller 26 and the central monitoring location, an acknowledgment signal indicating the successful completion of data transfer is transmitted to and received by the controller 26. This signal is normally sent from the central location following the transmission of data from the controller 26, if there is no reprogramming of the controller necessary. The controller then releases the telephone line by outputting a high voltage on the pulse dial output line, and re-enters its "sleep" mode.

In the preferred embodiment, the controller also initiates a call for when the battery voltage drops below a predetermined level. Referring again to FIG. 1, a "Low Battery" input to microcontroller is connected to the V+ power node via resistor 33. When the battery voltage drops below the predetermined voltage, the controller detects the drop during its next sampling cycle, and responds by initiating a call to the central monitoring location. After the call is initiated, the controller 26 transfers a code to the central location which indicates that the battery power is low. The distributor can then respond by sending a service person to the site to replace the battery. The calling sequence and method is the same as that used for reporting a change in oil level, except that the coded information indicates the low battery condition, rather than a low fuel condition.

Figure 4:
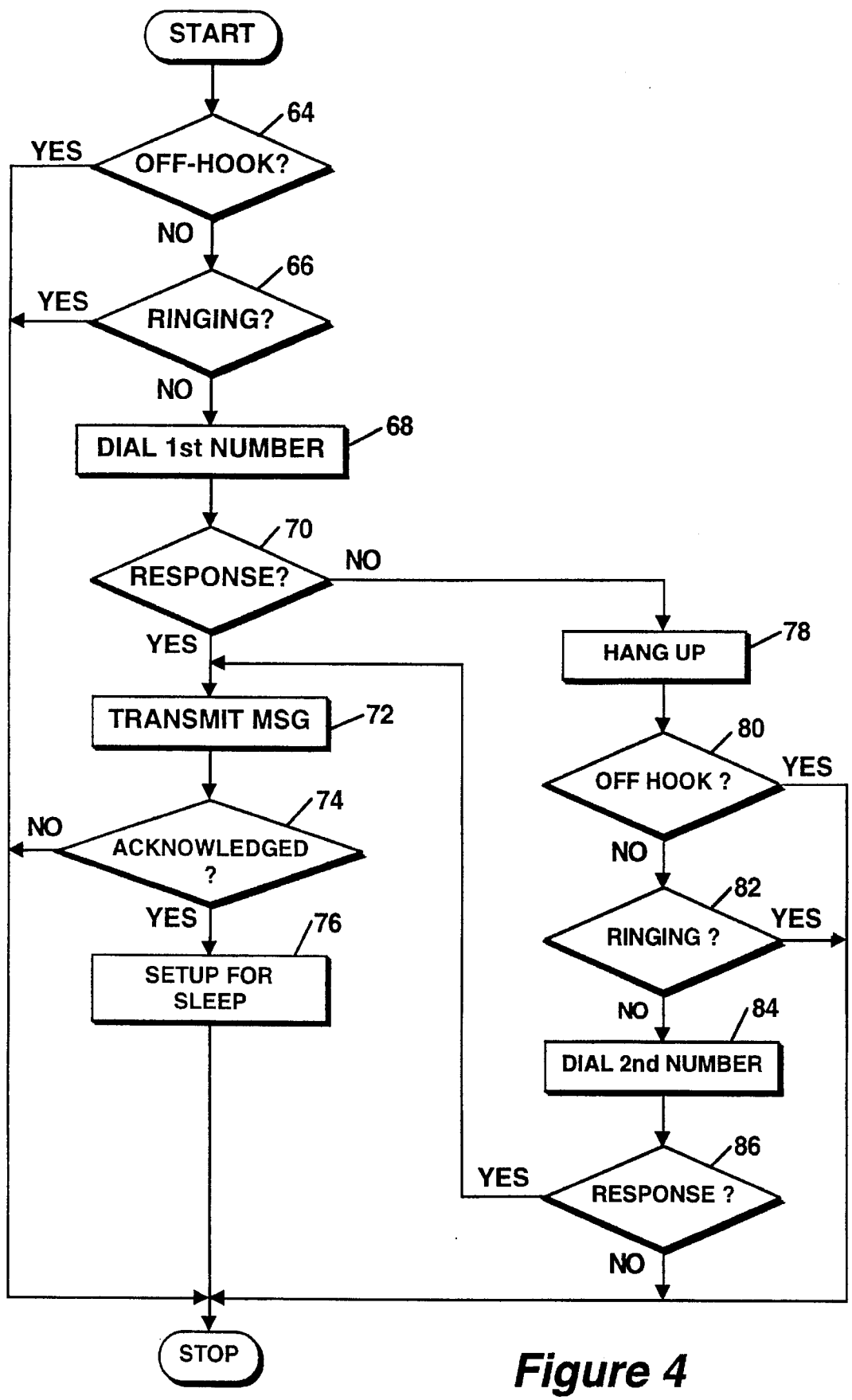
FIG. 4 is a flow diagram of an alternative calling sequence followed by the firmware of a residential fuel oil remote sensing device according to the present invention, which alternates between the use of two telephone numbers.

FIG. 4 is a flow diagram which depicts an alternative embodiment of the calling routine of controller 26. In this alternative embodiment, the remote unit 10 has two telephone numbers for the central monitoring location stored in memory unit 56, a primary number and a secondary number. As shown, the controller alternates between dialing the two different numbers until a response is received.

At the start of the dialing routine, controller 26 tests for an off-hook condition in step 64. If the line is off-hook, the routine stops. If the line is not off-hook, the controller, in step 66, checks for the presence of a ringing signal in step at the "SIG IN" input port. If a ringing signal is present, the routine stops. If no ringing signal is detected, the routine proceeds to step 68, in which the controller dials the first stored telephone number. It then waits for a response in step 70. If a response is detected, the controller proceeds to transmit the required message in step 72, and waits for acknowledgment (step 74). If there is no acknowledgment received within a predetermined time period (e.g. one minute), the routine stops. If acknowledgment is received, the controller sets up for a "sleep" cycle, and the routine stops.

If no response is detected in step 74 within a predetermined time period (one minute in the preferred embodiment), the controller terminates the off-hook condition (i.e. hangs up) in step 72. The controller then tests for an off-hook condition in step 80, and the routine stops if the off-hook condition exists. If an off-hook condition is not detected, the controller tests for a ringing signal on the line in step 82. If a ringing signal is detected the routine stops. If there is no ringing signal detected, the controller proceeds to dial the second number in step 84 and waits for a response. If no response is received in a predetermined time period (e.g. one minute) the routine terminates. If a response is detected, the routine proceeds to step 72, and continues with a message transmission and wait for acknowledgment, as described above.

If the routine stops without confirmation of a successful message transmission (i.e. never reaches step 76 of FIG. 4), the controller preferably sets a timer after the expiration of which, the routine is restarted. This timer is significantly shorter than the 15 minute sampling cycle and, in the preferred embodiment, is one minute. This prevents delays of 15 minutes between retrying the call out.

While the invention has been shown and described with reference to a preferred embodiment thereof, it will be recognized by those skilled in the art that various changes in form and detail may be made therein without departing from the spirit and scope of the invention as defined by the appended claims.

What is claimed is:

1. A remote level sensor for a residential fuel oil tank having a gauge with a permanent magnet which changes positions along a first axis with changes in the level of oil in the tank, the sensor comprising:

a housing;

a reed switch located in the housing which switches under the influence of a magnetic field from the magnet when the magnet is within a predetermined distance from the switch;

a controller connected to a telephone line for seizing the telephone line, dialing a telephone number and transmitting and receiving information over the telephone line, the controller detecting said switching of the reed switch and responding by initiating a telephone call to a monitoring location, and transmitting information to the monitoring location indicative of the switching of the reed switch;

a connector by which the housing is connected to the gauge, the connector being attached to a predetermined portion of the housing and receiving a top portion of the gauge such that the connector, when receiving said top portion of the gauge, maintains the housing in a predetermined position relative to the gauge and prevents movement of the housing in a first direction parallel to the first axis, such that location of the housing in the predetermined position is achieved by orienting the connector to receive the top portion, and moving the housing in the first direction until further movement is prevented by the connector.

2. A remote level sensor according to claim 1 wherein the connector is a first connector and wherein the level sensor further comprises a compliant second connector which receives the gauge, the second connector being shaped to partially encompass the gauge and sized so as to provide a pressure fit between an outer surface of the gauge and an inner surface of the second connector.

3. A remote level sensor according to claim 2 wherein the second connector comprises polypropylene.

4. A remote level sensor according to claim 1 further comprising a data storage unit accessible by the controller in which is stored a first telephone number, wherein the data storage unit is such that the telephone number which is stored in it may be replaced by a new telephone number received by the controller during said transmitting and receiving of information over the telephone line.

5. A remote level sensor according to claim 1 wherein the top portion of the gauge includes a convex surface, and wherein the housing has a concave portion which receives the top portion of the gauge.

6. A remote level sensor according to claim 5 wherein the convex surface of the gauge is a top surface of the gauge, and wherein the concave portion of the housing rests on the top of the gauge.

7. A remote level sensor according to claim 1 wherein the reed switch is a first reed switch and wherein said predetermined distance from the switch designates a magnates position which substantially corresponds to a first fluid level in the tank and wherein the level sensor comprises a second reed switch located such that it switches under the influence of a magnetic field from the magnet when the magnet reaches a position which substantially corresponds to a second discrete fluid level in the tank, the information transmitted by the controller to the monitoring location indicating which of the reed switches was switched.

8. A remote level sensor according to claim 7 further comprising a third reed switch located such that it switches under the influence of a magnetic field from the magnet when the magnet reaches a position which substantially corresponds to a third discrete fluid level in the tank, and wherein the controller detects the switching of the third reed switch and responds to the switching of the third reed switch by initiating a telephone call to the monitoring location, and transmitting information to the monitoring location indicating that the third switch was switched.

9. A remote level sensor according to claim 1 further comprising a data storage unit accessible by the controller in which are stored a first and a second telephone number, and wherein the controller, upon failure to establish a telephone connection with the first telephone number, accesses the second telephone number from the data storage unit and dials the second number to initiate said telephone call to the monitoring location.

10. A remote level sensor according to claim 1 wherein the connector partially surrounds the gauge to provide lateral support to the housing.

11. A remote level sensor for a residential fuel oil tank having a gauge with a permanent magnet which changes positions along a first axis with changes in the level of oil in the tank, the sensor comprising:

a plurality of reed switches each of which switches under the influence of a magnetic field from the magnet when the magnet is within a predetermined distance from that switch's respective location, the switches being in separate locations such that each switch is switched by the magnetic field of the magnet when the magnet is at a different relative position indicative of a different discrete fluid level in the tank;

a controller connected to a telephone line for seizing the telephone line, dialing a telephone number and transmitting and receiving information over the telephone line, the controller detecting said switching of the reed switches and responding by initiating a telephone call to a monitoring location, and transmitting information to the monitoring location indicative of which of the switches was switched;

a housing within which the reed switches and controller are located; and a connector by which the housing is connected to the gauge, the connector being attached to a predetermined portion of the housing and being shaped to receive a top portion of the gauge such that the connector, when receiving said top portion of the gauge, maintains the housing in a predetermined position relative to the gauge and prevents movement of the housing in a first direction parallel to the first axis, such that location of the housing in the predetermined position is achieved by orienting the connector to receive the top portion, and moving the housing in the first direction until further movement is prevented by the connector.

12. A remote level sensor according to claim 11 further comprising a battery power source which establishes a voltage node and provides power to the controller.

13. A remote level sensor according to claim 12 further comprising a phone line interface circuit which diverts electrical power from the telephone line to the voltage node.

14. A remote level sensor according to claim 11 wherein the connector is a first connector and wherein the level sensor further comprises a compliant second connector which receives the gauge, the second connector being shaped to partially encompass the gauge and sized so as to provide a pressure fit between an outer surface of the gauge and an inner surface of the second connector.

15. A remote level sensor for a residential fuel oil tank having a gauge with a permanent magnet which changes positions along a first axis with changes in the level of oil in the tank, the sensor comprising:

a housing;

a plurality of reed switches located in the housing each of which switches under the influence of a magnetic field from the magnet when the magnet is within a predetermined distance from that switch's respective location, the switches being in separate locations such that each switch is switched by the magnetic field of the magnet when the magnet is at a different relative position indicative of a different discrete relative fluid level in the tank;

a controller located in the housing and connected to a telephone line for seizing the telephone line, dialing a telephone number and transmitting and receiving information over the telephone line, the controller detecting said switching of the reed switches and responding by initiating a telephone call to a monitoring location, and transmitting information to the monitoring location indicative of which of the switches was switched;

a battery power source located in the housing which establishes a voltage node and provides power to the controller;

a phone line interface circuit which diverts electrical power from the telephone line to the voltage node; and a connector by which the housing is connected to the gauge, the connector being attached to a predetermined portion of the housing and being shaped to receive a top portion of the gauge such that the connector, when receiving said top portion of the gauge, maintains the housing in a predetermined position relative to the gauge and prevents movement of the housing in a first direction parallel to the first axis, such that location of the housing in the predetermined position is achieved by orienting the connector to receive the top portion, and moving the housing in the first direction until further movement is prevented by the connector.

* * * * *